June 2, 1964 C. W. CARTER 3,135,896
NARROW BAND SENSING CIRCUIT
Filed June 6, 1961
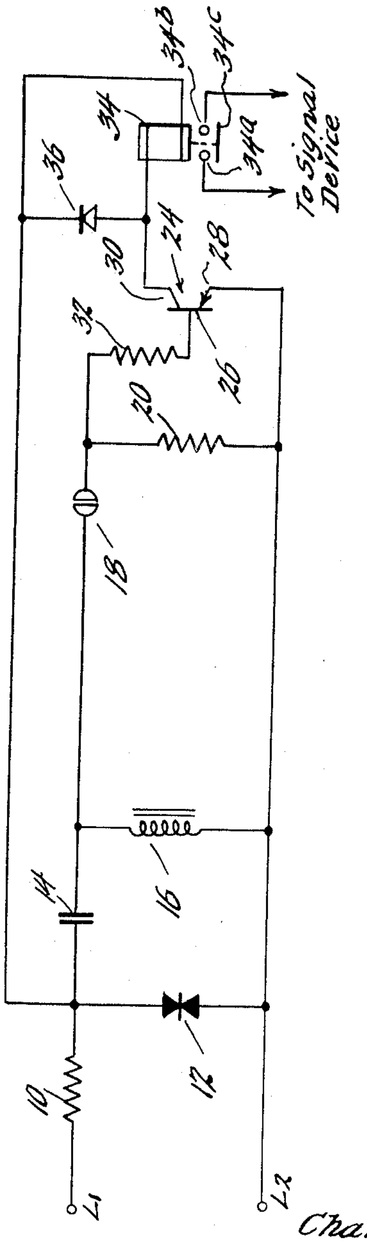
INVENTOR
Charles W. Carter,
BY Watson, Cole, Grindle & Watson
ATTORNEYS 3,135,896

NARROW BAND SENSING CIRCUIT

Charles W. Carter, Charlottesville, Va., assignor to United States Instrument Corporation, Charlottesville, Va., a corporation of Delaware Filed June 6, 1961, Ser. No. 115,261
8 Claims. (Cl. 317—147)

This invention relates to an electronic narrow band low frequency sensing circuit and, more particularly, to a frequency sensitive control circuit suitable for use in communications systems.

Priorly, numerous systems have been devised as narrow band sensing circuits in communications systems. These systems, however, exhibit certain disadvantages. For example, they often include a large number of parts and are thus expensive to fabricate. Further, these circuits are often subject to false operation due to surges in the signal voltages. When a sensing circuit will respond to surges in signal voltages, it may be falsely actuated by signals beyond the predetermined signal frequency band.

Accordingly, it is an object of this invention to provide an improved narrow band sensing circuit.

It is another object of this invention to provide a narrow band sensing circuit which contains a minimum of parts and is therefore economical to fabricate and requires a minimum of maintenance.

It is another object of this invention to provide a narrow band, frequency sensitive, circuit which exhibits a sharp cutoff on either side of the predetermined band.

Briefly, in accordance with aspects of this invention, the system includes four distinct sections, namely, a voltage input regulator section, a resonant circuit section, a voltage sensor section, and a switching section. Advantageously, the input voltage regulator section comprises a series connected resistor and a pair of oppositely poled "Zener" diodes.

Zener diodes are single silicon junction diodes which exhibit a high resistance region, a transition region, and a saturation voltage region in that order in response to increasing reverse voltages. These diodes are described in the Bell System Technical Journal, volume 33, No. 4, pages 827–835, dated July 1954, in an article entitled, "Transistors and Junction Diodes in Telephone Power Plants" by F. H. Chase, B. H. Hamilton, and D. H. Smith. When a pair of these diodes is serially connected in polarity opposition and the combination connected in parallel with a circuit, the diodes act as a bi-lateral voltage limiter to voltages. Thus the diodes will limit the voltage applied to the circuit to a predetermined value, regardless of polarity.

The resonant circuit section includes a series tuned circuit in which a capacitor is connected in series with an inductance across the output terminal of the input voltage regulator section and output from the resonant circuit section is derived across the inductance. The voltage sensor circuit includes a gaseous diode connected to one terminal of the inductance and a relatively high load impedance connected from the other terminal of the gaseous diode to the other terminal of the inductance.

Advantageously, the switching section includes a transistor with its base electrode connected to the gaseous diode through a suitable biasing resistor and its emitter electrode connected to the load impedance of the voltage sensor stage. A signalling circuit is connected in the collector electrode circuit of the switching section. Advantageously, this signalling device may include a relay and a diode connected in circuit with the relay to delay the release of the relay.

These and various other objects and features of the invention will be more clearly understood from a reading of the detailed description of the invention in conjunction with the drawing which is a schematic representation of one illustrative embodiment of this invention.

Referring now to the drawing, there is depicted, in schematic form, a narrow band, low frequency, sensing circuit according to one illustrative embodiment of this invention. L1 and L2 represent the input terminals of the sensing circuit which may be connected to a communication circuit (not shown). An input voltage regulator section comprising resistor 10 and oppositely poled Zener diodes 12 is connected to terminals L1 and L2. This section insures that the subsequent resonant circuit section is not subjected to excessive voltages of either polarity and, particularly, voltages beyond the predetermined frequency band, which voltages might otherwise cause false actuation of the sensing circuit.

The tuned circuit section is defined by a series resonant circuit which includes a capacitor 14 connected to the junction of resistor 10 and Zener diode 12 and an inductance 16 connected to the other terminal of the capacitor 14 and the other terminal of the pair of Zener diodes 12. The voltage sensor stage includes a gaseous discharge diode indicated as a neon lamp 18 having one terminal connected to the junction of capacitor 14 and inductance 16, and the other terminal connected to a load impedance 20. The other terminal of load impedance 20 is connected to the other terminal of inductance 16. When the voltage of the predetermined frequency to which the resonant circuit is tuned is applied across the terminals L1 and L2, the voltage across the inductor 16 increases sufficiently to ignite the gaseous discharge lamp 18, thereby establishing conduction through the lamp. The relatively high load impedance 20 prevents the destruction of resonance and acts as a transfer impedance to the subsequent switching section.

Advantageously, the switching section includes a transistor amplifier 24 with its base electrode 26 connected through a resistor 32 to the junction between the gaseous diode 18 and load impedance 20. The emitter electrode 28 of transistor 24 is connected to the other terminal of load impedance 20. The collector electrode 30 is connected through the winding of a relay 34 to the junction of resistor 10 and Zener diodes 12. A diode 36 is connected in parallel with the winding of relay 34 to delay the release time of relay 34 for a sufficient period to prevent chatter.

Relay 34 includes a pair of contacts **34*a* and 34*b* and an armature 34*c* which is attracted by the winding of relay 34 to close the circuit between contacts 34*a* and 34*b***. These contacts may be connected to any convenient form of signalling circuit.

While I have shown and described one illustrative embodiment of this invention, it is understood that the concepts thereof may be applied to other embodiments without departing from the spirit and scope of this invention.

What is claimed is:

1. A narrow band sensing circuit comprising a pair of input terminals, an input voltage regulator section connected across said input terminals, a series resonant section connected in parallel with a portion of said input voltage regulator section, a voltage threshold section connected in parallel with one reactive portion of said resonant section, and a switching section connected to said voltage threshold section and actuated thereby in response to the application of an input signal to said input terminals of a frequency to which said tuned section is tuned.

2. A sensing circuit according to claim 1 wherein said input voltage regulator section comprises a resistance and a pair of oppositely poled Zener diodes connected to define a series circuit between said input terminals.

3. A sensing circuit according to claim 2 wherein said resonant section comprises a series connected capacitor and inductance, said section being connected in parallel with said Zener diodes.

4. A narrow band sensing circuit comprising a pair of input terminals, an input voltage regulator section comprising a resistance and a pair of oppositely poled Zener diodes connected to define a series circuit between said input terminals, a series resonant section comprising a series connected capacitor and inductance, said series resonant section being connected in parallel with said Zener diodes, a voltage sensor section connected in parallel with a portion of said resonant section, and a switching section connected to said voltage sensor section and actuated thereby in response to the application of an input signal to said input terminals of that frequency to which said tuned section is tuned, said sensor section comprising a gaseous diode and a resistance connected in series, said gaseous diode being connected to the point intermediate said capacitor and said inductance, said last mentioned resistance being connected to the other terminal of said inductance.

5. A sensing circuit according to claim 4 wherein said switching section comprises a transistor having one electrode connected to one terminal of said last mentioned impedance and another electrode connected to the other terminal of said last mentioned impedance.

6. A sensing circuit according to claim 5 further comprising a relay having its winding connected between the collector electrode of said transistor and the junction between said first mentioned impedance and said Zener diode.

7. A sensing circuit according to claim 6 further comprising a diode connected in parallel with said relay winding to delay the release time of said relay winding thereby preventing chatter of said relay.

8. A sensing circuit according to claim 7 further comprising a resistor connected between the base electrode of said transistor and said gaseous diode.

References Cited in the file of this patent

UNITED STATES PATENTS

| | | |
|---|---|---|
| 2,153,202 | Nichols | Apr. 4, 1939 |
| 2,542,638 | Desch | Feb. 20, 1951 |
| 2,677,122 | Gardner | Apr. 27, 1954 |
| 2,960,637 | Lüscher | Nov. 15, 1960 |

OTHER REFERENCES

Publication: Electronic Control Handbook, 1946, p. 255.

Publication: Radio Electronics, November 1958, p. 35.